United States Patent [19]
De Bougrenet De La Tocnaye et al.

[11] Patent Number: 5,617,227
[45] Date of Patent: Apr. 1, 1997

[54] LIGHT DIFFRACTION DEVICE USING RECONFIGURABLE SPATIAL LIGHT MODULATORS AND THE FRACTIONAL TALBOT EFFECT

[75] Inventors: Jean-Louis De Bougrenet De La Tocnaye, Le Conquet; Habib Hamam, Brest; Renaud Moignard, Guipronvel, all of France

[73] Assignee: France Telecom Etablissement Autonome De Droit Public, Paris, France

[21] Appl. No.: 560,044

[22] Filed: Nov. 17, 1995

[51] Int. Cl.$^6$ .......................... G02F 1/1335; G02F 1/141; G03H 1/02
[52] U.S. Cl. ................................ 349/57; 359/569; 359/9; 359/73; 349/100; 349/117; 349/193
[58] Field of Search .................... 359/40, 48, 56, 359/63, 100, 9, 559, 569, 95, 82, 70, 71, 73

[56] References Cited

U.S. PATENT DOCUMENTS

| | | | |
|---|---|---|---|
| 5,373,393 | 12/1994 | DeJule et al. | 359/250 |
| 5,469,279 | 11/1995 | Sharp et al. | 359/100 |
| 5,552,916 | 9/1996 | O'Callaghan et al. | 359/100 |

OTHER PUBLICATIONS

Optics Letters, vol. 19, No. 20, Oct. 1994, Washington, US, pp. 1654–1656, H. Hamam et al., "Fractional Talbot Four-Level Phase–Only Holograms Using Ferroelectric Liquid–Crystal Spatial Light Modulators".

Optics Communications, vol. 109, No. 3/4, Jul. 1994, Amsterdam, NL, pp. 222–226, T. D. Wilkinson et al., "Dynamic Asymmetric Binary Holograms Using A Ferroelectric Liquid Crystal Spatial Light Modulator".

Electronics Letters, vol. 29, No. 18, Sep. 1993, Enage GB, pp. 1661–1663, S. E. Broomfield et al., "Four–Level, Phase Only, Spatial Light Modulator".

Applied Optics, vol. 33, No. 14, May 1994, New York, US, pp. 2795–2803, D. C. O'Brien et al., "Dynamic Holographic Interconnets That Use Ferroelectric Liquid–Crystal Spatial Light Modulators".

Applied Optics, vol. 31, No. 20, Jul. 1992, New York, US, pp. 3917–3929, Mark O. Freeman et al., "Quantized Complex Ferroelectric Liquid Crystal Spatial Light Modulators".

Inst. Phys. Conf. Ser. No. 139: Part II, Opt. Comput. Int. Conf. Edinburgh, Aug. 1994, (B.S. Wherret, ED.), 1995, Bristol, GB, pp. 187–190, D. C. O'Brien et al., "A Compact Hologrpahically Routed Optical Crossbar Using A Ferroelectric Liquid–Crystal Over Silicon Spatial Light Modulator".

Optik, vol. 79, No. 1, 1988, Stuttgart DE, pp. 41–45, Adolf W. Lohmann, "An Array Illuminator Based On The Talbot–Effect".

Proc. Conf. On Optical Computing, Edinburgh, 1994, D. C. O'Brien and D. J. Douglas, "A Compact Holographically Routed Optical Crossbar Using A Ferroelectric Liquid–Crystal Over Silicon Spatial Light Modulator".

Applied Optics, vol. 33, No. 14, May 1994, pp. 2775–2784, D. J. Douglas et al., "256 x 256 Liquid–Crystal–On–Silicon Spatial Light Modulator".

(List continued on next page.)

Primary Examiner—Anita Pellman Gross
Assistant Examiner—Tai V. Duong
Attorney, Agent, or Firm—Pearne, Gordon, McCoy & Granger

[57] ABSTRACT

Light diffraction device using reconfigurable spatial light modulators and the fractional Talbot effect. This device comprises two liquid crystal, electrically addressable spatial light modulators (M1, M2) on a semiconductor substrate and at least one polarizing beam splitter (2), the optical path between the modulators being equal to $(2k+1) Z_T/4^n$ in which k and n are natural integers, n differing from zero, and $Z_T$ is the Talbot distance relative to a biperiodic hologram obtained by means of one of the modulators and at one of the periods equal to double the other, which makes it possible to obtain a reconfigurable hologram having four phase levels. Application to optical telecommunications.

12 Claims, 2 Drawing Sheets

OTHER PUBLICATIONS

Applied Optics, vol. 32, No. 28, Oct. 1993, pp. 5549–5556, A. O'Hara et al., "Mirror Quality And Efficiency Improvements Of Reflective Spatial Light modulators By The Use Of Dielectric Coatings And Chemical–Mechanical Polishing".

Applied Optics, vol. 26, No. 14, 1987, pp. 2788–2798, M. A. Seldowitz et al., "Synthesis Of Digital Holograms By Direct Binary Search".

Opt. Eng., vol. 28, No. 11, 1989, pp. 1162–1167, J. Turunen et al., "Kinoform Phase Relief Synthesis: A Stochastic Method".

LIGHT DIFFRACTION DEVICE USING RECONFIGURABLE SPATIAL LIGHT MODULATORS AND THE FRACTIONAL TALBOT EFFECT

DESCRIPTION

1. Technical Field

The present invention relates to a light diffraction device, more particularly applicable to optical telecommunications.

2. Prior Art

Acousto-optic cells are already known which are able to deflect light beams in accordance with one dimension in space and in a rapid manner at a frequency of approximately 100 kHz.

Using two crossed cells of this type, it is possible to bring about a deflection of the light beams in accordance with two dimensions in space.

The efficiency of a single acousto-optic cell is approximately 85%. Two cascade-connected cells have a total efficiency of approximately 72%.

Spatial light modulators are also known, which make it possible to obtain reconfigurable holograms and which are referred to by the abbreviation SBEASLM. They are silicon backplane electrically addressed spatial light modulators.

The use of such a SBEASLM in binary phase modulation for producing a reconfigurable hologram is mentioned in the following document:

(1) D.C. O'Brien and D. J. Douglas, "A compact holographically routed optical crossbar using a ferroelectric liquid-crystal over silicon spatial light modulator", Proc. Conf. on Optical Computing, Edinburgh, 1994.

The SBEASLM referred to in document (1) comprises a network of 256×256 pixels and uses a ferroelectric liquid crystal coating and it is described in the following document:

(2) D. J. Douglas, K. M. Johnson and R. A. Serati, 256×256 liquid-crystal-on-silicon spatial light modulator, Applied Optics, vol. 33, No. 14, May 1994, pp 2775 to 2784.

For the SBEASLM described in document (2), the filling factor, defined as the ratio between the area of the active optical part of a pixel to the total area of said pixel, is approximately 60% and the display frequency of a complete hologram is 10 kHz. It should be noted that filling factors close to 90% have already been obtained.

In this connection reference can be made to the following document:

(3) A. O'Hara, J. R. Hannah, I. Underwood, D. G. Vass and R. J. Holwill, "Mirror quality and efficiency improvements of reflective spatial light modulators by the use of dielectric coatings and chemical-mechanical polishing", Applied Optics, vol. 32, No. 28, Oct. 1993, pp 5549 to 5556.

Acousto-optic cells are relatively costly. In addition, they only make it possible to bring about light beam deflection.

Therefore they do not have such a great flexibility of use as computer generated holograms.

Ferroelectric liquid crystal SBEASLMs make it possible to produce reconfigurable, pure phase holograms, but only two phase levels (0 and $\pi$) are technically available. The use of a hologram with two phase levels suffers from a disadvantage.

Thus, it is a real hologram and the reconstruction must have Hermitian symmetry in order to obtain a high diffraction efficiency.

DESCRIPTION OF THE INVENTION

The object of the invention is to obviate the aforementioned disadvantages. The invention uses the fractional Talbot effect for obtaining a hologram with four phase levels from two binary phase holograms.

More specifically, the present invention relates to a light diffraction device, characterized in that it comprises:

first and second electrically addressable and therefore reconfigurable, liquid crystal, spatial light modulators on a semiconductor substrate, each of said first and second modulators operating by reflection and making it possible to produce a reconfigurable binary hologram, the hologram produced with the first modulator being periodic in two perpendicular directions, the period in one of these two directions being equal to double the other period in the other direction and at least one polarizing beam splitter, the light being directed from the first to the second modulator by means of said beam splitter, the optical path between the first and second modulators being equal to $(2k+1)Z_T/4^n$, in which k and n are natural integers, n differing from zero, and $Z_T$ is the Talbot distance relative to the hologram obtained by means of the first modulator and at said period, the first and second modulators being arranged with respect to the polarizing beam splitter so as to obtain a reconfigurable hologram with four phase levels.

The use in the present invention of two electrically addressable, liquid crystal spatial light modulators on a semiconductor substrate makes it possible to obtain a device which can have a high degree of integration and a high reconfiguration rate or level. Moreover, the device according to the invention permits the obtaining of a reconfigurable hologram with four phase levels ($0, \pi/2, \pi$ and $3\pi/2$).

Such a hologram has a diffraction efficiency well above that of a reconfigurable hologram with two phase levels.

The device according to the invention can have a diffraction efficiency comparable to that of acousto-optic cells, whilst having a larger number of applications than said cells.

According to a preferred embodiment of the device according to the invention the liquid crystal is ferroelectric. The tilt angle of said ferroelectric liquid crystal is preferably 45°.

For integration and speed questions, use is preferably made in the invention of silicon substrate SBEASLMs for the first and second modulators. These SBEASLMs have a high degree of integration and a high reconfiguration rate.

For a maximum optical efficiency, the filling factor must be as high as possible.

Preferably the integer k referred to hereinbefore is equal to zero, in order to obtain a very compact device. Preferably the integer n referred to hereinbefore is equal to 1, in order to obtain a very efficient device.

According to a first embodiment of the device according to the invention, the first and second spatial modulators are parallel and positioned on either side of the polarizing beam splitter.

According to a second embodiment, the first and second spatial modulators are perpendicular and adjacent.

According to a third embodiment, the first and second spatial modulators are perpendicular and adjacent and the device also comprises:

a plane mirror parallel to the second modulator, said second modulator and the plane mirror being placed on either side of the polarizing beam splitter and a quarter-wave plate parallel to the plane mirror and interposed between the latter and the polarizing beam splitter.

According to a fourth embodiment, the first and second spatial modulators have the same substrate, the device comprising two polarizing beam splitters, which are respectively placed facing the first and second spatial modulators and also:

- a plane mirror parallel to said first and second spatial modulators, the polarizing beam splitters being interposed between said plane mirror and the first and second spatial modulators and
- a quarter-wave plate is interposed between said plane mirror and the polarizing beam splitters.

According to a fifth embodiment, the first and second spatial modulators have the same substrate and the device also comprises two perpendicular, plane mirrors, the polarizing beam splitter being placed between said two plane mirrors and the first and second spatial modulators.

In the present invention the first and second spatial modulators can be identical. This is of particular interest in the case of the fourth and fifth embodiments referred to hereinbefore.

BRIEF DESCRIPTION OF THE DRAWINGS

The present invention will be better understood by studying the following description of non-limitative embodiments with reference to the attached drawings, wherein show.

DETAILED DESCRIPTION OF EMBODIMENTS

Figure 1:
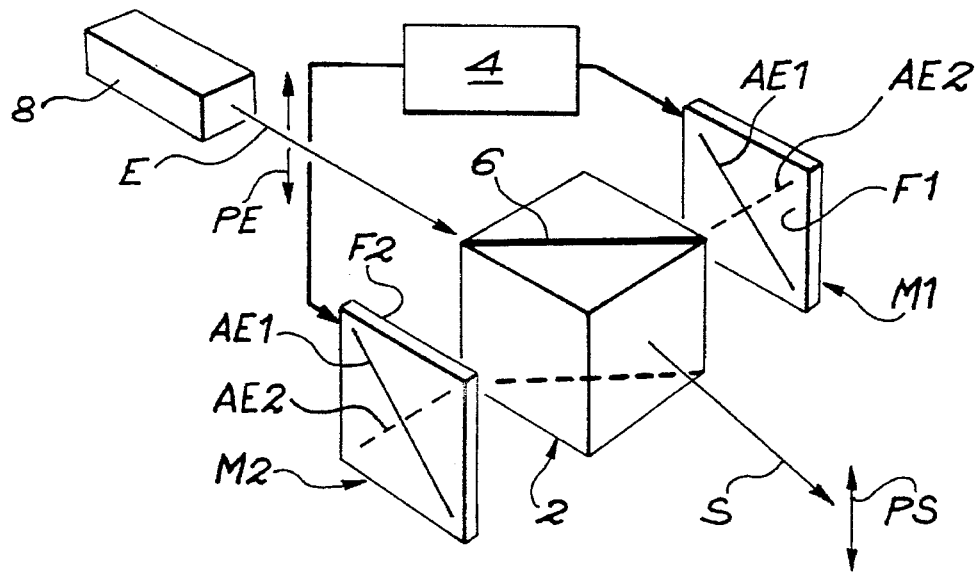
FIG. 1 A diagrammatic, perspective view of an embodiment of the device according to the invention using two SBEASLMs on either side of a polarizing beam splitter cube.

It is pointed out that the present invention uses the fractional Talbot effect for obtaining a hologram with four phase levels from two binary phase holograms. These holograms are respectively formed by means of two liquid crystal, electrically addressable, spatial light modulators on a semiconductor substrate and preferably two SBEASLMs.

It is assumed that formation takes place of a hologram with two phase levels and periodic in two perpendicular directions U, V with one of said two modulators and said hologram, or first hologram, is illuminated by means of a monochromatic source. The length of said source in free space is designated $\lambda_0$ and the mean refractive index of the medium in which the light of the source propagates is designated N.

Consideration is given to the Cartesian coordinate system u, v, w, in which the axis of the u corresponds to the direction U and the axis of the v corresponds to the direction V. The axis of the w is obviously perpendicular to the axis of the u and to the axis of the v.

It is assumed that the first hologram is placed in the plane w=0. The period of this first hologram along u is designed $d_u$. The period of said first hologram along v is designated $d_v$.

The distribution of the electromagnetic field in the coordinate system u, v, w for said periods d and d is designated:

$$H_{d_u,d_v}(u,v,w)$$

The Talbot distance $Z_T^{d_u}$ relative to the period $d_u$ is equal to the following quantity:

$$2d_u^2/\lambda \text{ with } \lambda = N.\lambda_0.$$

The Talbot distance $Z_T^{d_v}$ relative to the period $d_v$ is:

$$2d_v^2/\lambda.$$

The transmittance of the first hologram is:

$$H_{d_u,d_v}(u,v,0).$$

The periods $d_u$ and $d_v$ are chosen so that:

$$Z_T^{d_v} = 4 Z_T^{d_u}$$

On considering the distance z such that:

$$z = \frac{1}{4} \cdot Z_T^{d_v} = \frac{1}{4} \cdot (2d_v^2/\lambda) = Z_T^{d_u}.$$

The quantity $H_{d_u,d_v}(u,v,z)$, then proves the following equation:

$$H_{d_u,d_v}(u,v,z) = 2^{-\frac{1}{2}}(A+B)$$

with: $A = e^{-i\frac{\pi}{4}} \cdot H_{d_u,d_v}(u,v,0)$ $$B = e^{+i\frac{\pi}{4}} \cdot H_{d_u,d_v}\left(u, v - \frac{d_v}{2}, 0\right).$$

$H_{d_u,d_v}(u,v,z) = 2^{-1/2}(A+B)$
with $A = e^{-i\pi/4} \cdot H_{d_u,d_v}(u, v, 0)$ $B = e^{+i\pi/4} \cdot H_{d_u,d_v}(u, v - d_v/2, 0).$ At the distance z from the first hologram, which is a fractional Talbot distance, one therefore obtains the sum of the two replicas of the first hologram, which are displaced by the quantity $d_v/2$ and are respectively multiplied by $$e^{-i\frac{\pi}{4}} \text{ and } e^{+i\frac{\pi}{4}},$$

which is equivalent to a hologram with four phase levels of independent values on a distance $d_v/2$ along v.

According to the invention, the hologram, or second hologram, which the second, binary phase modulator makes it possible to form, is inserted at said fractional distance z so that the two, thus arranged, binary phase holograms form a hologram with four phase levels.

If the two binary phase holograms are programmable, which is the case with SBEASLMs, the optical device obtained is usable for producing computer generated holograms having a high diffraction efficiency.

The search algorithm of the two binary holograms with a view to responding to a given diffraction problem can be determined by the expert. It is possible to use methods such as direct binary search or simulated annealing.

Reference can be made in this connection to the following documents:

(4) M. A. Seldowitz, J. P. Allebach and D. W. Sweeney, "Synthesis of digital holograms by direct binary search", Applied Optics, vol. 26, No. 14, pp 2788 to 2798, 1987.

(5) J. Turunen, A. Vasara, J. Westerholm, "Kinoform phase relief synthesis: a stochastic method", Opt. Eng., vol. 28, No. 11, pp 1162 to 1167, 1989.

As has been seen hereinbefore, use is preferably made of SBEASLMs in the present invention as spatial modulators for producing the binary holograms. They are in fact highly integrated, rapid components. It should be noted that the size of the pixels of the spatial modulators is a critical parameter.

Thus, a large pixel size implies a large period for a periodic hologram and therefore a considerable Talbot distance relative to said period, which increases the global size of the device.

256×256 pixel SBEASLMs with 40 μm pixels are available from the central research laboratory of Thorn EMI. SBEASLMs having 10 μm pixels are also available.

With the CS-2005 smectic liquid crystal C* of Chisso, which has a tilt angle close to 45° and operating in linear polarization, such SBEASLMs (used as quarter-wave plates in reflection) permit the obtaining of a polarizer-free modulation $(0, \pi)$.

A light diffraction device according to the invention is diagrammatically shown in perspective in FIG. 1. This device comprises two SBEASLMs, which respectively carry the references M1 and M2 and are referred to merely as modulators for reasons of simplicity hereinafter.

The device of FIG. 1 also comprises a polarizing beam splitter cube 2, which is placed between the two modulators M1 and M2.

Control means 4 of the modulators M1 and M2 permit the formation, from said two modulators M1 and M2, of two holograms chosen by the user.

Each of the modulators M1 and M2 comprises a ferroelectric, liquid crystal coating, whose tilt angle is 45° and which faces the cube 2.

F1 and F2 are the faces of the modulator M1 and M2 on the side of which is located the ferroelectric, liquid crystal. These faces F1 and F2 face the polarizing beam splitter cube 2.

It is known that such a cube comprises a polarizing beam splitter means in a diagonal plane which has the reference 6 is FIG. 1 and which contains two edges of the cube belonging to two separate faces thereof.

As can be seen in FIG. 1, the respective faces F1 and F2 of the modulators M1 and M2 are parallel to one another and to the two opposite faces of the cube 2, each forming an angle of 45° with the diagonal plane 6.

Figure 2:
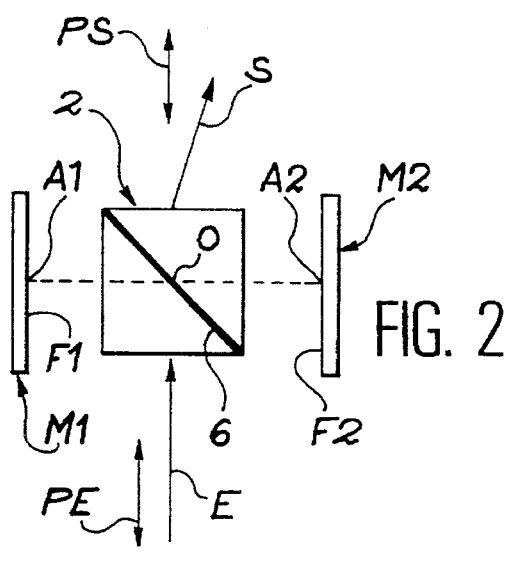
FIG. 2 Diagrammatically the device of FIG. 1 in plan view.

A linearly polarized, monochromatic light source 8 supplies a light beam E or input beam, whose linear polarization is represented by the symbol PE on FIG. 1. This beam E is parallel to the respective faces F1 and F2 of the modulators M1 and M2. Moreover, said beam forms an angle of 45° with the diagonal plane 6 of the cube 2 and encounters said diagonal plane in the centre 0 of the cube 2 (FIG. 2).

It is pointed out that the polarization direction PE of the beam E is parallel to the respective faces F1 and F2 of the modulators M1 and M2 and to the diagonal plane 6.

The cube 2 (or more precisely the polarizing beam splitter means located in the diagonal plane 6) reflects the light having the polarization PE and which can be referred to as "vertical polarization".

In addition, said cube transmits the light, whose polarization is perpendicular to that indicated hereinbefore and which can be called "horizontal polarization".

For a certain voltage applied to the modulators M1 and M2, the extraordinary axis of the ferroelectric, liquid crystal of said modulators M1 and M2 assumes a certain direction AE1.

When the opposite voltage is applied to said modulators, said extraordinary axis of the liquid crystal assumes a direction AE2 perpendicular to the direction AE1.

In the case of the device of FIG. 1, the directions AE1 respectively corresponding to the modulators M1 and M2 are parallel and form an angle of 45° with the polarization PE, as can be seen in FIG. 1.

In the same way, the directions AE2 respectively corresponding to the modulators M1 and M2 are parallel and also form an angle of 45° with the polarization PE.

The modulator M1 is controlled in such a way as to create a periodic hologram in two perpendicular directions U and V, the period along V being double the following period U.

Thus, in a following period V there are twice more pixels of the modulator M1 than in a following period U.

The modulator M2 is controlled in such a way as to create another hologram (period or non-periodic).

Reference will be made hereinafter to the distance between the modulators M1 and M2.

The beam E interacts with the hologram having four phase levels produced by means of the device of FIG. 1 and which is spatially modulated by said hologram.

The device of FIG. 1 supplies a diffracted beam S resulting from said spatial modulation. The polarization PS of said beam S is parallel to the polarization PE.

It is pointed out that the beam E is reflected on the diagonal plane 6 and interacts with the hologram produced by the modulator M1, which leads to the obtaining of a horizontal polarization beam, which is then transmitted by the diagonal plane 6 and interacts with the hologram produced by the modulator M2 to give a vertical polarization beam. The latter is then reflected by the diagonal plane 6 and at the output the vertical polarization beam PS is obtained.

A1 is the foot or base of the lowered perpendicular of 0 on face F1 of modulator n1. A2 is the foot or base of the lowered perpendicular of 0 on the face F2 of modulator M2.

It is pointed out that the distance A1–A2 between the respective faces F1 and F2 of the modulators M1 and M2 is equal to quarter the Talbot distance $Z_T$ relative to the modulator M1 first encountered by the light supplied by the source 8 and relative to the period along V referred to hereinbefore.

It would also be possible to position the modulators at a distance from one another equal to an uneven multiple of said value $Z_T/4$.

In order to meet the different technological constraints, the Talbot distance can be chosen by regulating different parameters such as:

the wavelength in the vacuum of the source 8, the mean optical index encountered by the light from said source and the period of the hologram which the modulator M1 makes it possible to obtain.

Tables I to V at the end of the present description give the Talbot distances divided by four $Z_T/4$, expressed in cm, for different pixel sizes (10, 20, 30 and 40 μm) and two wavelengths (0.633 and 1.55 μm) in air, i.e. for an optical index substantially equal to 1 (whereas in glass said optical index is equal to approximately 1.67, which reduces the Talbot distance).

Each table corresponds to a different size of the period along V of the first hologram, formed by means of the modulator M1.

The figures in the tables in heavy print correspond to particularly compact devices.

In theory, an infinity of periods is necessary in the modulator M1 of FIG. 1 to satisfy the conditions of the Talbot effect. However, in practice, the Talbot effect can be observed with only a small number of periods.

There is also a local extremum in the diffraction efficiency for a distance $Z_T/4^n$ between the two modulators M1 and M2, n being an integer higher than 1. Thus, there is a considerable freedom in the positioning of the modulators M1 and M2. It is possible to use holograms with 32×32 pixels, or 64×64 pixels or 128×128 pixels.

The embodiments of the invention diagrammatically shown in plan view in FIGS. 3 to 6 use the two modulators M1 and M2 (SBEASLMs) of FIG. 1.

The control means 4 of said modulators are not shown in FIGS. 3 to 6, or in FIG. 2 and this also applies with respect to the source 8.

Figure 3:
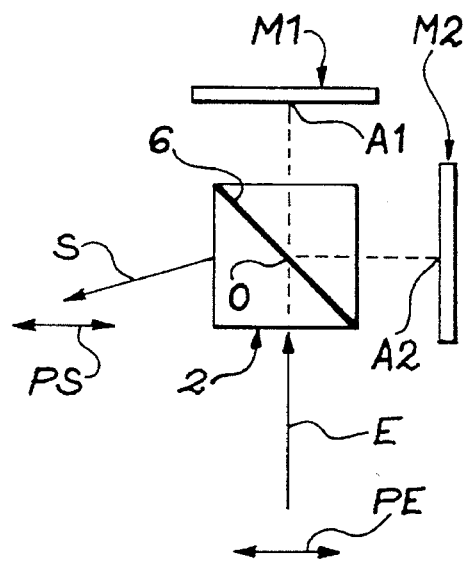
FIGS. 3 & 4 Diagrammatic plan views of variants of the device of FIGS. 1 and 2.

The device of FIG. 3 is deduced from that of FIG. 2 by subjecting the modulator M1 to a +90° rotation in the clockwise direction about an axis perpendicular to the plane of FIG. 2 and passing through the centre 0 of the cube 2. The modulators M1 and M2 are then adjacent and perpendicular to one another.

In the case of FIG. 3, it is the distance A10 and OA2, which is equal to $Z_T/4$.

It is pointed out that the device of FIG. 3 can be made more compactly than that of FIG. 2. It is pointed out that for the use of the device of FIG. 3, use is made of an input beam E with horizontal polarization PE. This beam is then transmitted by the diagonal plane 6 of the cube 2 to arrive at the modulator M1. The output beam S also has a horizontal polarization PS. Thus, the device of FIG. 3 retains the polarization like the device of FIG. 2.

Figure 4:
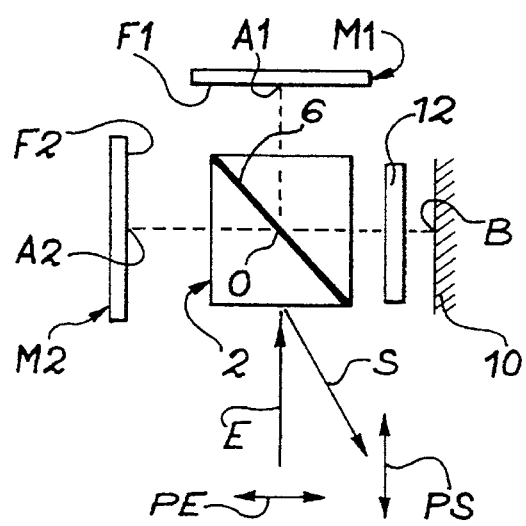

The device of FIG. 4 comprises, in addition to the modulators M1 and M2 and the cube 2, a plane mirror 10 and a quarter-wave plate 12. The device of FIG. 4 is deduced from that of FIG. 3 by subjecting the modulator M2 to a 180° rotation in the clockwise direction around an axis passing through the centre 0 of the cube and perpendicular to the plane of FIG. 3.

In addition, the plane mirror 10 is positioned parallel to the face F2 of the modulator M2, opposite the modulator M2 with respect to the cube 2.

The quarter-wave plate 12 is positioned parallel to the mirror, between the latter and the cube 2.

Use is made of an input beam E with horizontal polarization PE for the operation of the device of FIG. 4. The output beam S has a vertical polarization PS.

Consideration is given to the mirror point B, which is the intersection of the mirror with a line passing through the cube centre 0 and perpendicular to said mirror. The intersection point of said line with the face F2 of the modulator M2 is the point A2.

In the case of the device of FIG. 4, the following equation applies:

$$A1O+OB+BA2=Z_T/4.$$

The device of FIG. 4 can be produced more compactly than that of FIG. 3.

The devices according to the invention diagrammatically shown in FIGS. 5 and 6 once again use the two modulators M1 and M2. However, in the case of FIGS. 5 and 6, said two modulators are formed on the same substrate 14.

Figure 5:
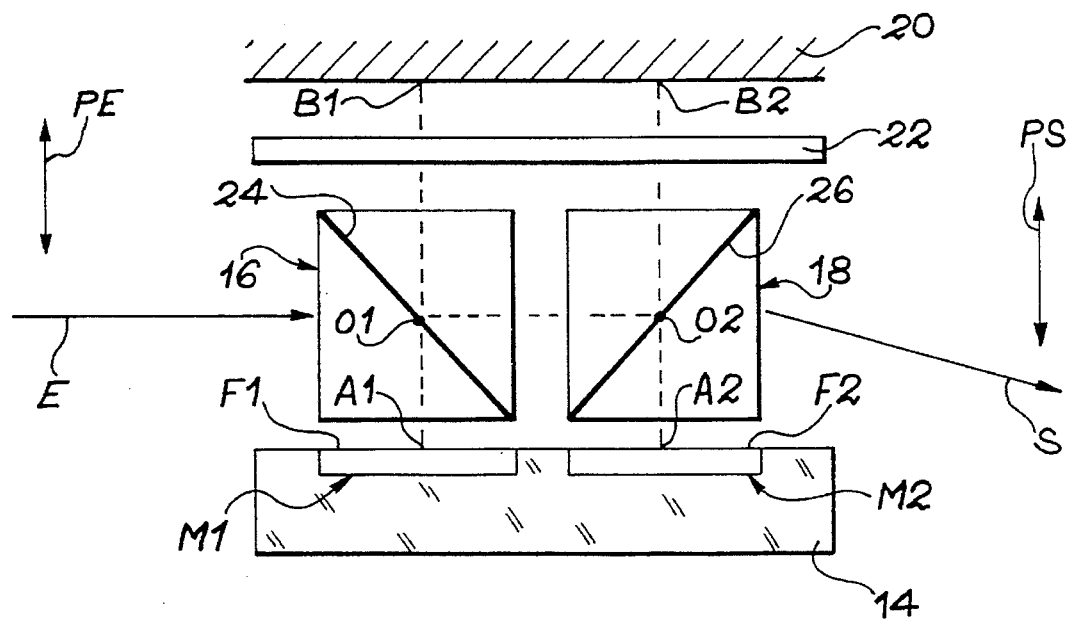
FIG. 5 Diagrammatically and in plan view, a device according to the invention using two SBEASLMs formed on the same substrate.
Figure 6:
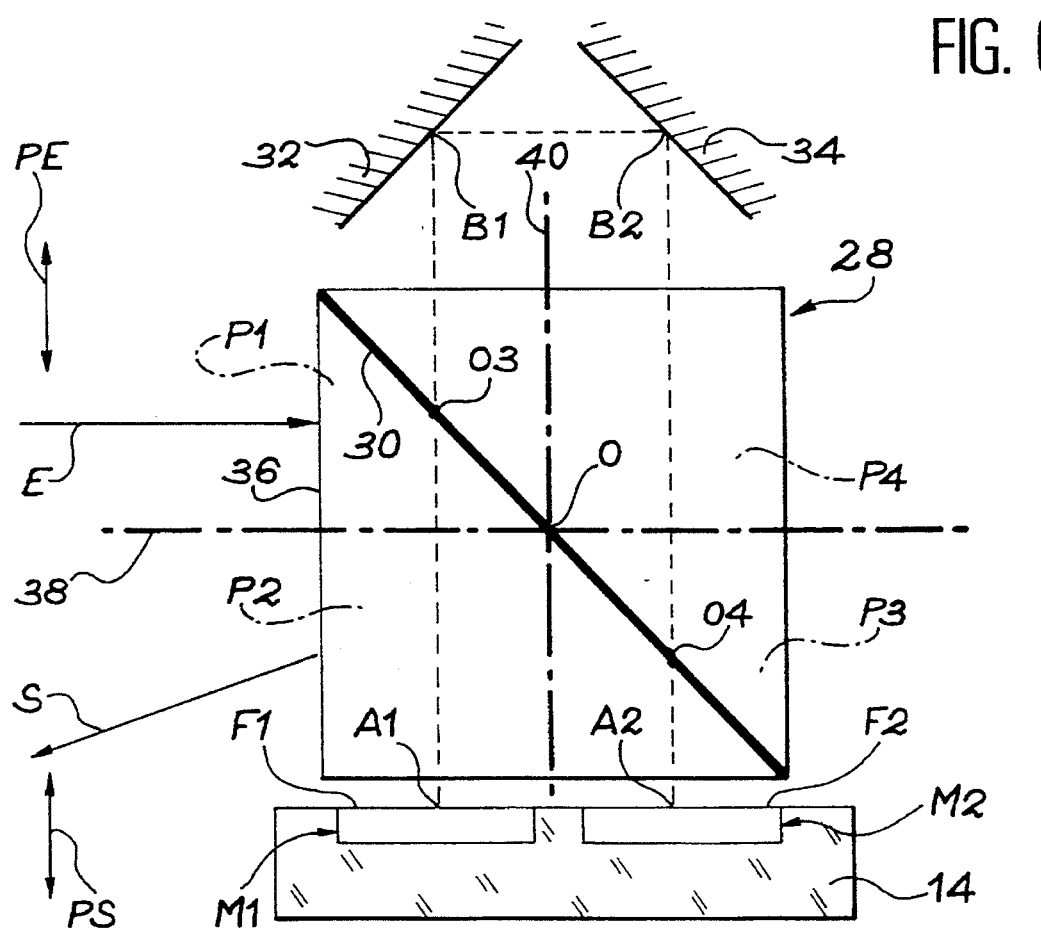
FIG. 6 Diagrammatically and in plan view a variant of the device of FIG. 5.

It is even possible to use as modulators M1 and M2, in the case of FIGS. 5 and 6, two separate parts of the same SBEASLM.

The device according to FIG. 5 operates in transmission and comprises, apart from the modulators M1 and M2, two polarizing beam splitter cubes 16, 18, a plane mirror 20 and a quarter-wave plate 22.

As can be seen in FIG. 5, the two cubes 16 and 18 are respectively positioned facing the modulators M1 and M2. The mirror 20 is positioned opposite the modulators with respect to said cubes. The quarter-wave plate 22 is positioned between the mirror and the cubes, as can be seen in FIG. 5.

More specifically, the respective diagonal planes 24 and 26 of the cubes 16 and 18, where are positioned the actual polarizing beam splitter means, are perpendicular to one another. Moreover, said diagonal planes 24, 26 respectively form angles of 45° with the faces F1 and F2 of the modulators M1 and M2. The mirror 20 and the plate 22 are parallel to said faces F1 and F2. The faces of the cubes 16 and 18, which are respectively placed facing the faces F1 and F2 of the modulators M1 and M2, are parallel to said faces F1 and F2.

In the case of FIGS. 5 and 6, in each of the two states of the ferroelectric liquid crystal contained by the modulators M1 and M2, the extraordinary axes of the ferroelectric, liquid crystal of the two modulators M1 and M2 are parallel. They also form an angle of 45° with the polarization direction PE of the input beam E.

The device of FIG. 5 operates in transmission. For the operation of said device, use is made of a vertical polarization, input light beam E. In the case of FIG. 5, this means that the polarization direction of said beam E is parallel to the diagonal planes 24, 26 of the cubes 16, 18 and to the faces F1 and F2 of the modulators M1, M2. The output beam S also has a vertical polarization PS.

In the case of FIG. 5, the input beam E firstly interacts with the modulator M1 after having been reflected on the diagonal plane 24 of the cube 16.

In the case of the device of FIG. 5, on once again considering the Talbot distance $Z_T$ of the modulator M1, the following equation applies:

$$A1B1+B1O1+O1O2+O2B2+B2A2=Z_T/4$$

In said equation, O1 and O2 respectively represent the centres of the cubes 16 and 18. A1 represents the intersection of the face F1 of the modulator M1 with a line passing through O1 and perpendicular to said face F1. Point B1 is the intersection of said line and the plane mirror 20.

Point A2 is the intersection of the face F2 of the modulator M2 with another line passing through O2 and perpendicular to said face F2. Point B2 is the intersection of said other line passing through O2 with the plane mirror 20.

It should be noted that the device of FIG. 5 retains the polarization.

The device of FIG. 6 functions in reflection and only uses a single polarizing beam splitter cube. This cube carries the reference 28 in FIG. 6 and the diagonal plane of said cube, where the polarizing beam splitter means is located, carries the reference 30.

In addition to the modulators M1 and M2 and the cube 28, the device of FIG. 6 comprises two plane mirrors 32, 34, which are perpendicular to one another.

The cube 28 is located between the assembly formed by these two mirrors 32, 34 and the assembly formed by the two modulators M1, M2, as can be seen in FIG. 6.

The diagonal plane 30 of the cube 28 forms an angle of 45° with the respective faces F1, F2 of the modulators M1, M2. The plane mirror 32 is placed opposite the modulator M1 with respect to the cube 28. The plane mirror 34 is placed opposite the modulator M2 with respect to the cube 28.

The mirror 32 forms an angle of 45° with the face F1 of the modulator M1. Said mirror 32 is perpendicular to the diagonal plane 30. Mirror 34 forms an angle of 45° with face F2 of modulator M2. The mirror 34 is parallel to the diagonal plane 30.

Use is made of an input beam E with vertical polarization PE for the operation of the device of FIG. 6. This means that the direction of said polarization PE is parallel to the diagonal plane 30 and to the respective faces F1, F2 of the modulators M1, M2.

The vertical polarization input beam E is reflected on the diagonal plane 26 and then interacts with the modulator M1. The output beam S also has a vertical polarization PS.

It should be noted that this beam S exits by the face 36 of the cube 28 by which the input beam E penetrates the device of FIG. 6.

On considering a plane 38 passing through the centre 0 of the cube 28, perpendicular to the face 36 of cube 28 and parallel to the faces F1, F2 of the modulators M1, M2 and another plane 40 passing through the centre 0 of cube 28 and parallel to the face 36 of cube 28, said planes 38 and 40 split the beam 28 into four rectangular parallelepipeds.

Two of these parallelepipeds face the modulator M1 and have the references P1 and P2. The two other parallelepipeds face the modulator M2 and carry the references P3 and P4.

It is considered that the point 03 is the centre of the parallelepiped P1 furthest from the modulator M1 and that point 04 is the centre of the parallelepiped P3 closest to the modulator M2.

The input light beam E penetrates the cube 28 and reaches the point 03 from which it is reflected in the direction of the modulator M1.

The line passing through point 03 and perpendicular to the face F1 of the modulator M1 encounters said face F1 at point A2 and encounters the mirror 32 at point B3.

The line passing through point 04 and perpendicular to the face F2 of the modulator M2 encounters said face F2 at point A2 and encounters the mirror 34 at point B4.

In the case of FIG. 6, the following equation applies:

$$A1B3 + B3B4 + B4A2 = Z_T/4$$

As in the case of FIGS. 1 to 5, the quantity $Z_T$ represents the Talbot distance relative to the modulator M1, which is first encountered by the beam E.

In compactness terms, the configurations of FIGS. 5 and 6 are of an optimum nature, because the optical paths are folded.

It should be noted that the device of FIG. 6 has an advantage over that of FIG. 5 due to the possibility of regulating, with the aid of the two plane mirrors 28, 30, the alignment of the two holograms obtained with the modulators M1 and M2.

It is possible to give orders of magnitude for the size of a global device according to the invention.

Table VI at the end of the description gives examples for various configurations and for:

- a given pixel size (10 µm),
- a given wavelength (1,55 µm),
- a given period along V (64 pixels/period),
- a given resolution of the two SBEASLMs (256×256) and an optical index of 1.

The size of each SBEASLM is approximately 2.6×2.6 mm.

Under these conditions, use is made of a 5 mm side length, polarizing splitter cube.

In table VI, the parameters X, Y and Z represent the side lengths of a parallelepiped, in which it is possible to place the device corresponding to a given configuration.

TABLE I $Z_T/4$ in cm for an 8 pixel period

| | | Pixel size in µm | | | |
|---|---|---|---|---|---|
| | | 10 | 20 | 30 | 40 |
| Wavelength in µm | 0.633 | 0.5 | 2.02 | 4.5 | 8.08 |
| | 1.55 | 0.2 | 0.83 | 1.86 | 3.3 |

TABLE II $Z_T/4$ in cm for a 16 pixel period

| | | Pixel size in µm | | | |
|---|---|---|---|---|---|
| | | 10 | 20 | 30 | 40 |
| Wavelength in µm | 0.633 | 2.02 | 8.08 | 18.1 | 32.4 |
| | 1.55 | 0.83 | 3.3 | 7.4 | 13.2 |

TABLE III $Z_T/4$ in cm for a 32 pixel period

| | | Pixel size in µm | | | |
|---|---|---|---|---|---|
| | | 10 | 20 | 30 | 40 |
| Wavelength in µm | 0.633 | 8.1 | 32.3 | 72.8 | 129.4 |
| | 1.55 | 3.3 | 13.2 | 29.7 | 52.8 |

TABLE IV $Z_T/4$ in cm for a 64 pixel period

| | | Pixel size in µm | | | |
|---|---|---|---|---|---|
| | | 10 | 20 | 30 | 40 |
| Wavelength in µm | 0.633 | 32.3 | 130 | 291 | 517 |
| | 1.55 | 13.21 | 52.8 | 119 | 211.4 |

TABLE V $Z_T/4$ in cm for a 128 pixel period

| | | Pixel size in µm | | | |
|---|---|---|---|---|---|
| | | 10 | 20 | 30 | 40 |
| Wavelength in µm | 0.633 | 129 | 517 | 1164 | 2070 |
| | 1.55 | 52.8 | 211 | 475 | 846 |

TABLE VI

| | Size of device in mm | | |
|---|---|---|---|
| Configuration of: | X | Y | Z |
| FIG. 1 | 5 | 5 | 132 |
| FIG. 3 | 5 | 67 | 67 |
| FIG. 4 | 5 | 67 | 33 |
| FIG. 5 or 6 | 5 | 40 | 30 |

We claim:

1. Light diffraction device, characterized in that it comprises:

first (M1) and second (M2) liquid crystal, electrically addressable light spatial modulators on a semiconductor substrate, each of the first and second modulators operating by reflection and making it possible to create a reconfigurable binary hologram, the hologram created with the first modulator being periodic in two perpendicular directions, the period along one of these two directions being equal to double the other period in the other direction and at least one polarization beam splitter (2; 16, 18; 28), the light being directed from the first to the second modulator by means of said beam splitter, the optical path between the first and second modulators being equal to $(2k+1)Z_T/4^n$, in which k and n are natural integers, n differing from zero, and $Z_T$ being the Talbot distance relative to the hologram obtained by means of the first modulator and at said period, the first and second modulators being positioned with respect to the polarizing beam splitter so as to obtain a reconfigurable hologram with four phase levels.

2. Device according to claim 1, characterized in that the liquid crystal is ferroelectric.

3. Device according to claim 2, characterized in that the tilt angle of said ferroelectric liquid crystal is substantially 45°.

4. Device according to claim 1, characterized in that the substrate is of silicon.

5. Device according to claim 1, characterized in that the integer k is equal to zero.

6. Device according to claim 1, characterized in that the integer n is equal to one.

7. Device according to claim 1, characterized in that the first (M1) and second (M2) spatial modulators are parallel and placed on either side of the polarizing beam splitter (2).

8. Device according to claim 1, characterized in that the first (M1) and second (M2) spatial modulators are perpendicular and adjacent.

9. Device according to claim 1, characterized in that the first (M1) and second (M2) spatial modulators are perpendicular and adjacent and in that the device also comprises:

a plane mirror (10) parallel to the second modulator (M2), said second modulator and the plane mirror being placed on either side of the polarizing beam splitter (2) and a quarter-wave plate (12) parallel to the plane mirror and interposed between the latter and the polarizing beam splitter.

10. Device according to claim 1, characterized in that the first (M1) and second (M2) spatial modulators have the same substrate (14) and that the device comprises two polarizing beam splitters (16, 18) placed respectively facing the first (M1) and second (M2) spatial modulators and also:

a plane mirror (20) parallel to said first and second spatial modulators, the polarizing beam splitters being interposed between said plane mirror and the first and second spatial modulators and a quarter-wave plate (22) interposed between the plane mirror and the polarizing beam splitters.

11. Device according to claim 1, characterized in that the first (M1) and second (M2) spatial modulators have the same substrate (14) and in that the device also comprises two perpendicular plane mirrors (32, 34), the polarizing beam splitter (28) being placed between said two plane mirrors and the first and second spatial modulators.

12. Device according to claim 1, characterized in that the first (M1) and second (M2) spatial modulators are identical.

\* \* \* \* \*

UNITED STATES PATENT AND TRADEMARK OFFICE
CERTIFICATE OF CORRECTION

PATENT NO. : 5,617,227
DATED : April 1, 1997
INVENTOR(S) : De Bougrenet De La Tocnaye et al.

It is certified that error appears in the above-indentified patent and that said Letters Patent is hereby corrected as shown below:

Col. 3, line 67, delete "d and d" and insert therefore --$d_u$ and $d_v$--.

Col. 4, line 13, delete "$H_{d_u d_v}(u,v,0)$" and insert therefore --$H_{d_u,d_v}(u,v,0)$--.

Col. 4, line 22, delete "$H_{d_u d_v}(u,v,z)$," and insert therefore --$H_{d_u,d_v}(u,v,z)$--.

Title Page:

Page 2, line 3 under "Other Publications", delete "modulators" and insert therefore --Modulators--.

Signed and Sealed this

Second Day of September, 1997

*Attest:*

*Attesting Officer*

BRUCE LEHMAN

*Commissioner of Patents and Trademarks*